United States Patent
Peterson et al.

(10) Patent No.: US 11,148,737 B1
(45) Date of Patent: Oct. 19, 2021

(54) TRACK PAD AND FASTENER BAR THEREFOR

(71) Applicant: Superior Tire & Rubber Corp., Warren, PA (US)

(72) Inventors: Joseph J. Peterson, Warren, PA (US); Michael A. Manis, Kennedy, NY (US)

(73) Assignee: Superior Tire and Rubber Corp., Warren, PA (US)

( * ) Notice: Subject to any disclaimer, the term of this patent is extended or adjusted under 35 U.S.C. 154(b) by 310 days.

(21) Appl. No.: 16/436,291

(22) Filed: Jun. 10, 2019

Related U.S. Application Data

(60) Provisional application No. 62/683,089, filed on Jun. 11, 2018.

(51) Int. Cl.
*B62D 55/28* (2006.01)

(52) U.S. Cl.
CPC .................... *B62D 55/28* (2013.01)

(58) Field of Classification Search
CPC ...... B62D 55/26; B62D 55/28; B62D 55/286; B62D 55/275
See application file for complete search history.

(56) References Cited

U.S. PATENT DOCUMENTS

| | | | |
|---|---|---|---|
| 3,944,296 A | 3/1976 | Stampone | |
| 4,448,459 A | 5/1984 | Kortering et al. | |
| 6,832,820 B2 | 12/2004 | Watanabe et al. | |
| 7,156,473 B2 | 1/2007 | Hori et al. | |
| 8,011,739 B2 | 9/2011 | Busley | |
| 11,027,788 B2 * | 6/2021 | Delisle | B62D 55/244 |
| 2020/0086936 A1 * | 3/2020 | Gallagher | B62D 55/275 |

* cited by examiner

*Primary Examiner* — Jason R Bellinger
(74) *Attorney, Agent, or Firm* — Boardman & Clark LLP

(57) ABSTRACT

A track or wear pad for a grouser of continuous track or track tread of a tracked vehicle such as a bulldozer, excavator, tractor or crawler, the track pad including an elastomeric shoe and a fastener bar. The fastener bar is a continuous, single-piece of material that includes substantially parallel legs spaced apart by connector portion, with a collar or flange provided around each of the legs, and the track shoe is molded or otherwise provided around the connector portion, a portion of each leg, and at least a portion of the flange or collar.

20 Claims, 4 Drawing Sheets

TRACK PAD AND FASTENER BAR THEREFOR

CROSS-REFERENCE TO RELATED APPLICATIONS

This application claims the benefit of U.S. Patent Application Ser. No. 62/683,089, filed Jun. 11, 2018, the disclosure of which is incorporated herein by reference in its entirety.

BACKGROUND

The present inventions relate to the field of construction, demolition and earth-moving equipment having continuous tracks or track tread. The present inventions more specifically relate to the field of bolt-to-shoe track and wear pads for a grouser, grouser bar, or shoe typically found on tracked vehicle machines (e.g., bulldozers, excavators, tractors, crawlers, etc.).

Typical crawler or continuous tracks for track-type vehicles such as bulldozers are structured with iron shoe plates with grousers coupled by a number of links. Such tracks can cause serious surface damage and are often provided with a track pad to help prevent such damage to the surfaces on which they travel.

Referring to FIGS. 1-3, bolt-to-shoe track pads 10 are utilized to protect surfaces as tracked or continuous track vehicles such as construction or demolition machines pass over them. Track pads may also allow for increased traction in some applications such as milling where steel may not have good traction with concrete or pavement. Track pads include a pad 20 or rear pad, which is typically made of an elastomer, fastened to a shoe or grouser 30 using fasteners. Fasteners are typically coupled to core bars having bolts 40 and/or threaded portions thereof provided partially within pads 20 and extending through pads 20 and grousers 30. Typically, fastener bars and a portion of the threaded bolts 40 are embedded within wear pads 20 and a portion of threaded bolts 40 is exposed from the bottom or track side 50 of pads 20.

Referring now to FIGS. 2-3, a known core bar 60 is shown. As illustrated, known core bar 60 is typically produced using a forged bar, cast bar, or flat stock 62 coupled to threaded bolts 64. Referring to FIG. 4, another known core bar 70 is shown. As illustrated, known core bar 70 includes generally flat stock or a cast or forged bar 72 with apertures defined therein and through which individual threaded bolts 74 are provided.

Such known core bars 60/70 require a number of manufacturing steps including cutting, bending, punching holes in bars 60/70, and/or coupling threaded bolts 64 and flat stock 62 via welding. Each of these steps negatively impacts cost and throughput.

Referring again to FIG. 1, known core bars and/or fasteners have limitations. For example, in part because the core bars are embedded within wear pads 20, many known bars are not configured for steel-to-steel contact between the bars and the grousers 30. Over time, this can cause pads 20 to loosen relative to grousers 30 as the machines on which they are provided are used and as the weight of the machine compresses the elastomer of pad 20 between the bar and grouser 30. In other cases, such as that shown in FIG. 2, some known track pads 66 are able to produce a steel-on-steel interaction between the threaded bolts 64 and the grouser, but such track pad bars 60 and bolts 64 can be difficult to weld and couple together which adds cost and complexity to the manufacturing process. In addition, the requirement of welding and positioning of threaded bolts 64 relative to the pad to produce the desired steel-on-steel contact can increase the complexity and difficulty of manufacturing and assembly. Such core bars 60 also lack quality and reliability.

It is also known to provide pads having a flat plate coupled to threaded nuts provided within the elastomer pad. Such known pads are attached to a grouser by threading bolts through the grouser into the threaded nuts within the pad and tightening the bolts. This method of attachment, however, also has disadvantages. In particular, such known pads experience alignment difficulties during installation and removal.

SUMMARY

There is a need for a track pad that could be manufactured with less complexity (e.g. by reducing a need for various known cutting, bending, punching, and/or welding steps). There is also a need for a track pad that could be manufactured with less cost. There is also a need for a track pad having improved quality and reliability by, for example, having reduced risk of failure from welds or assemblies. Accordingly, improved bolt-to-shoe track pads are provided.

Accordingly, a track pad for a tracked vehicle is disclosed, the track pad comprising: a single piece fastener bar comprising spaced apart, substantially parallel opposing legs extending outwardly from a connector portion extending between the opposing legs; and an elastomeric track shoe or pad provided around the connector portion and a portion of the opposing legs.

Accordingly, a track pad for a tracked vehicle is also disclosed, the track pad comprising: a continuous fastener bar having opposing ends bent to form spaced apart, substantially parallel opposing legs extending outwardly from a connector portion extending between the opposing legs; and an elastomeric track shoe or pad provided around the connector portion and a portion of the opposing legs.

BRIEF DESCRIPTION OF DRAWINGS

Various examples of embodiments of the systems, devices, and methods according to this invention will be described in detail, with reference to the following figures, wherein.

Figure 1:
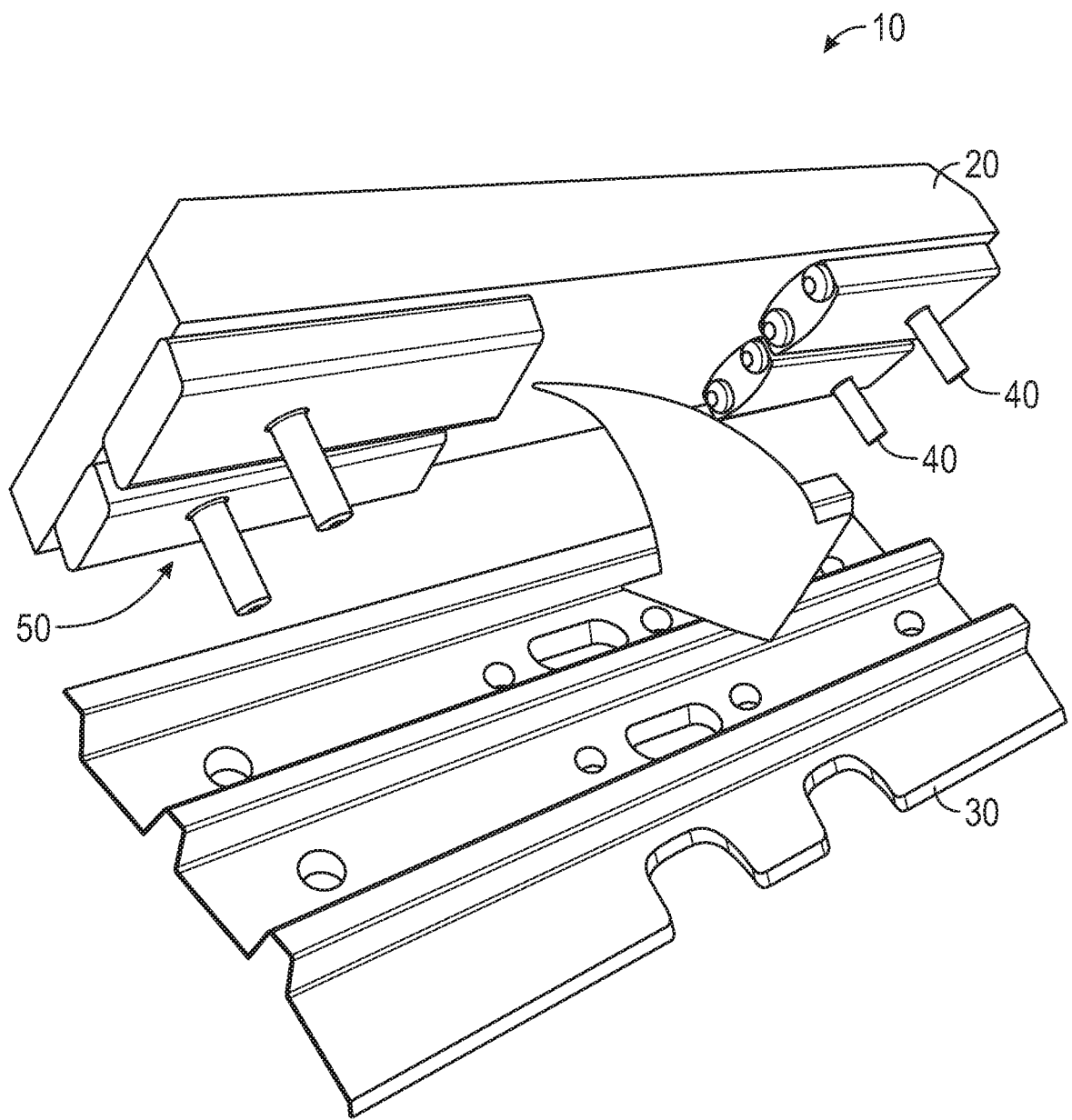
FIG. 1 illustrates an exploded respective view of a known track pad and grouser or shoe.
Figure 2:
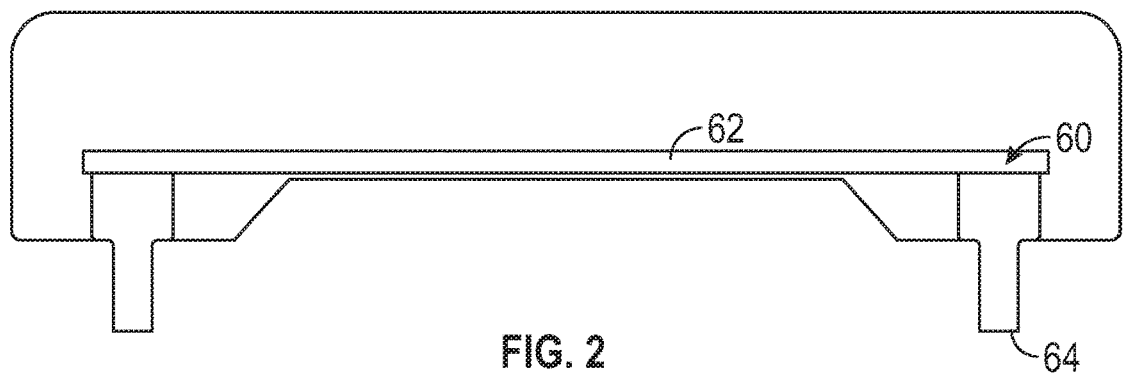
FIG. 2 illustrates a cross-sectional front view of a known track pad.
Figure 3:
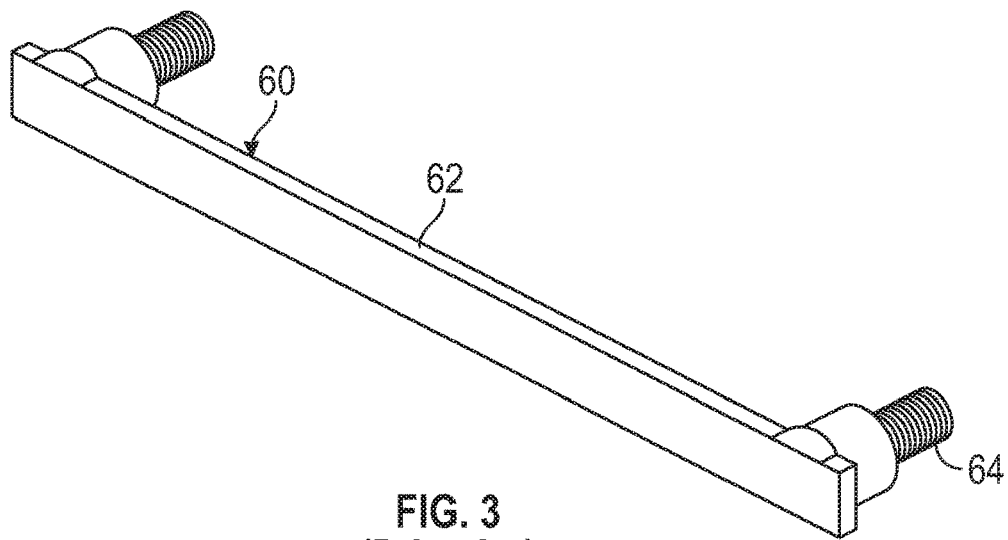
FIG. 3 illustrates a perspective view of a known forged bar design coupled with bolt-like fasteners.
Figure 4:
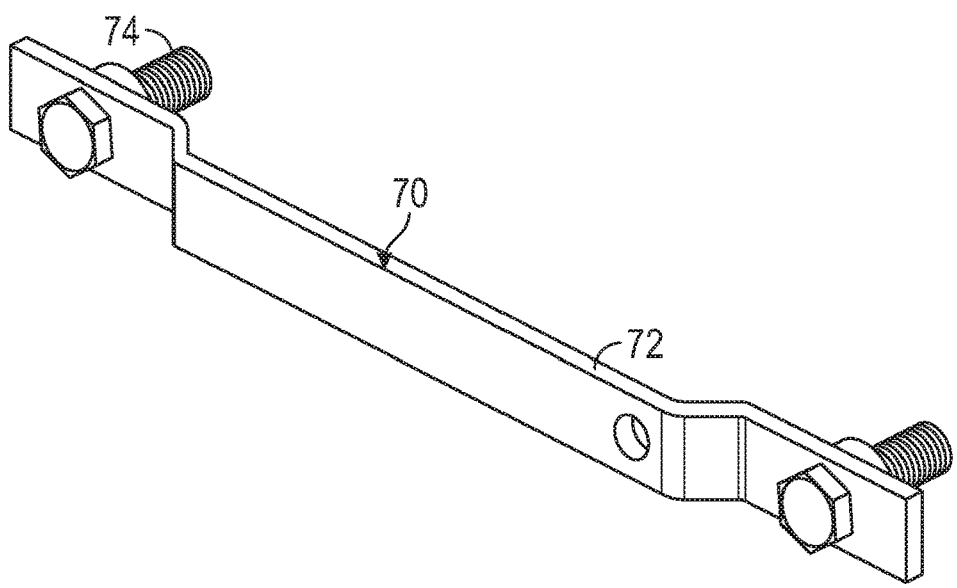
FIG. 4 illustrates a perspective view of a known forged core bar design assembled with bolt-like fasteners.
Figure 5:
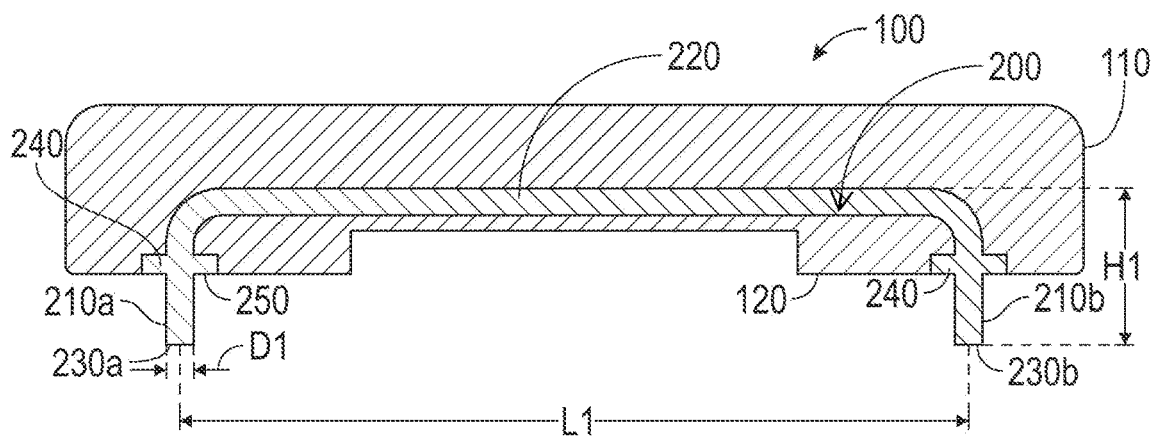
FIG. 5 illustrates a cross-sectional front view of a track pad including a fastener bar, according to various examples of embodiments.
Figure 6:
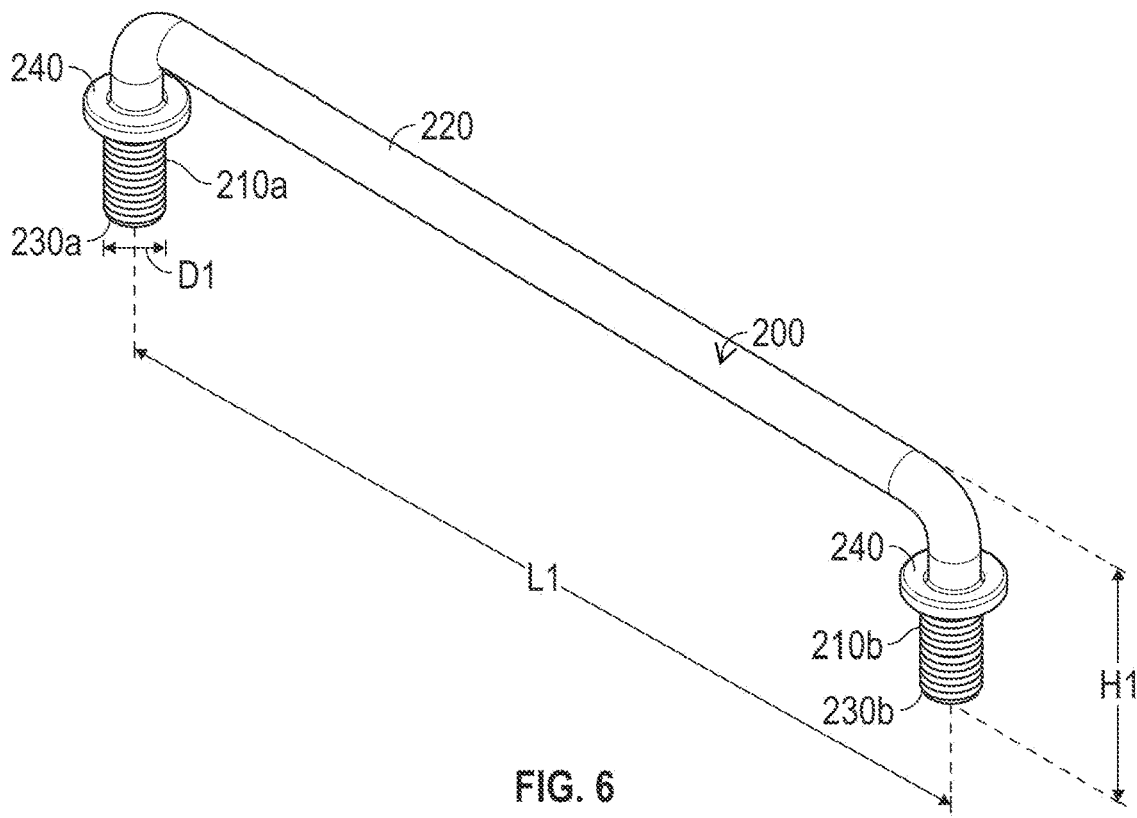
FIG. 6 illustrates a perspective view of a fastener bar, according to various examples of embodiments.
Figure 7:
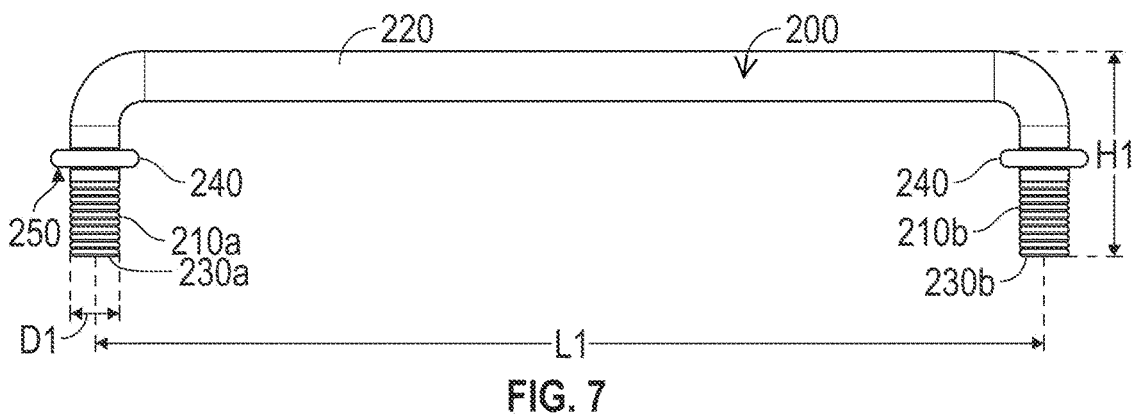
FIG. 7 illustrates a front view of a fastener bar, according to various examples of embodiments.
Figure 8:
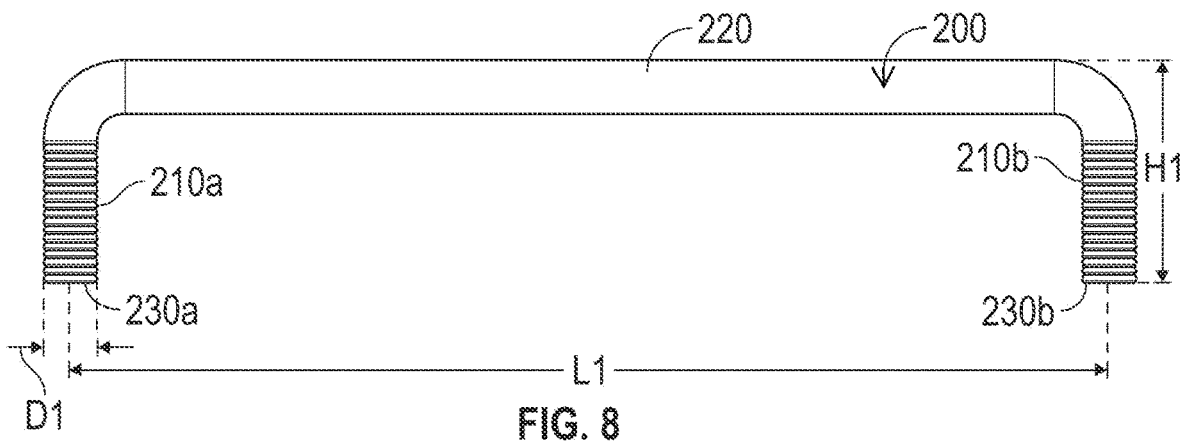
FIG. 8 illustrates a front view of a track pad fastener bar, according to various examples of embodiments.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to FIGS. 5-10, improved bolt-to-shoe track pads and core or fastener bars therefor are provided. More particularly, in various embodiments, the disclosed one-piece bolt-to-shoe track pad and fastener bar does not require multiple components, such as bolts or custom-threaded fasteners, and as such requires less assembly and no welding while providing improved strength and reliability.

Referring more specifically to FIGS. 5-8, a track pad 100 is illustrated. In various embodiments, track pad 100 includes an elastomeric track shoe 110 (e.g., made from rubber or the like) and bonded, molded on, and/or coupled to a fastener bar 200. In various embodiments, and referring now to FIGS. 5-6, fastener bar 200 includes one or more legs 210a, 210b, and a connector portion 220 therebetween, arranged in a "c" or a "u" shape (e.g., cross-sectional shape).

More specifically, in various embodiments, fastener bar 200 includes spaced apart, substantially parallel opposing legs 210a, 210b extending outwardly from connector portion 220. Legs 210a, 210b have threaded ends 230a, 230b configured to cooperate with a plurality of fasteners (not shown).

In various examples of embodiments, connector portion 220 and/or legs 210a, 210b have a generally circular cross-sectional shape. However, in other embodiments, the legs can have other cross-sectional shapes sufficient to cooperate with the plurality of fasteners. Legs 210a, 210b have a diameter D1. In various embodiments, diameter D1 is in a range of from about 0.250 inches to about 0.750 inches. In the various embodiments, diameter D1 is in a range of from about 0.375 inches to about 0.625. In various embodiments, diameter D1 is in a range of from about 0.500 inches to about 0.565 inches. However, it should be appreciated that in other embodiments, the diameter can be any dimension, including less than about 0.250 inches or more than about 0.750 inches.

Legs 210a, 210b have a height H1. In various embodiments, height H1 is in a range of from about 2.00 inches to about 2.80 inches. In the various embodiments, height H1 is in a range of from about 2.10 inches to about 2.60 inches. In various embodiments, height H1 is in a range of from about 2.30 inches to about 2.40 inches. However, it should be appreciated that in other embodiments, the height can be any dimension including less than about 2.00 inches or more than about 2.80 inches.

Legs 210a, 210b are spaced apart by a center to center length L1. In various embodiments, center to center length L1 is in a range of from about 7.00 inches to about 14.00 inches. In various embodiments, center to center length L1 is in a range of from about 10.40 inches to about 11.00. In various embodiments, center to center length L1 is in a range of from about 10.66 inches to about 10.80 inches. However, it should be appreciated that in other embodiments, the center to center length can be any dimension including less than about 7.00 inches or more than about 14.00 inches. In various embodiments, height H1 is less than length L1. However, height H1 may be equal to or greater than length L1.

In various embodiments, the single-piece fastener bars may be manufactured to different lengths to allow for or accommodate other (e.g., lateral) orientations relative to the track pad or track shoe. For example, the bar may be shortened or otherwise sized to run between both holes in a shorter width dimension of the track shoe.

In various embodiments, fastener bar 200 is a one-piece member. In various embodiments, fastener bar 200 is formed as a continuous, single piece. For example, bar 200 may be formed as a single piece and bent near its ends to form legs 210a, 201b, and connector portion 220. In various embodiments, single piece formation improves strength and reduces manufacturing complexity and cost relative to know fastener bars and/or track pads.

In various embodiments, connector portion 220 is substantially straight and fastener 200 has a radius where each leg 210a, 210b meets connector portion 220. It should be appreciated, however, that the fastener bar may not be substantially straight.

In various embodiments, track pad 100 also includes a plurality of fasteners (not shown) configured to couple to legs 210a, 210b and cooperate to clamp track pad 100 to a shoe or grouser. In various embodiments, legs 210a, 210b have threaded ends configured to cooperate with the one or more fasteners. In various embodiments, the fasteners have threaded apertures configured to cooperate with the threaded ends of legs 210a, 210b. The threaded apertures and threaded ends can have any desired thread pattern sufficient to cooperate with each other.

In various embodiments, fastener bar 200 may include one or more flanges or collars 240 formed, incorporated into, or provided on, in or around legs 210a, 210b. In various embodiments, fastener bar 200 may include a collar 240. In various embodiments, fastener bar 200 includes a single piece design and/or a collar 240 including or having a substantially consistent surface for mold sealing. In various embodiments, collar 240 includes a grouser-side surface 250 exposed near or at a grouser-side margin 120 of track shoe 110.

Figure 9:
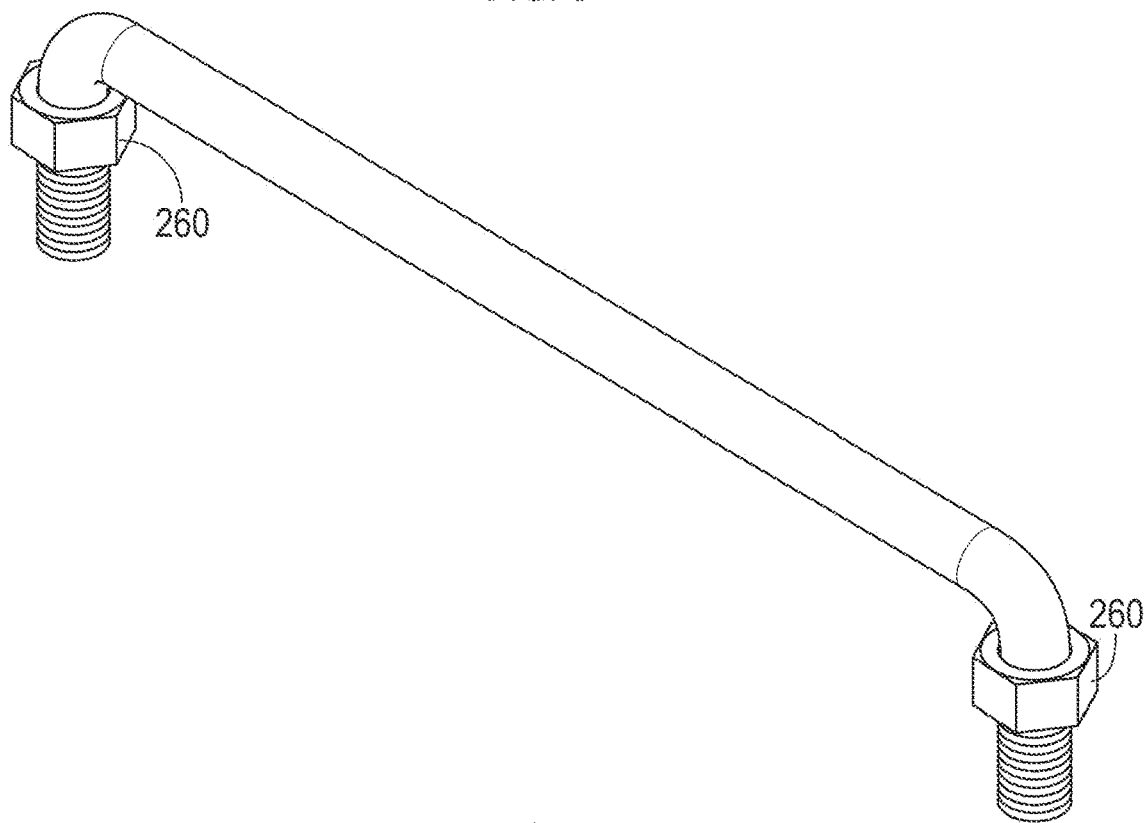
FIG. 9 illustrates a perspective view of a fastener bar, according to various examples of embodiments.

In various examples of embodiments, and as illustrated in FIG. 9, fastener bar 200 includes another type of fastener 260 (e.g., a standard nut) threaded onto legs 210a, 210b. Such collars or fasteners disclosed herein may be used to provide a steel-on-steel connection or configuration between the fastener bar and the fasteners.

Figure 10:
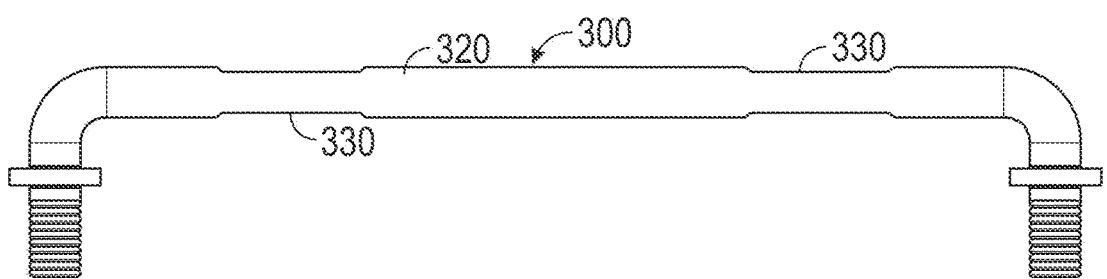
FIG. 10 illustrates a front view of a fastener bar, according to various examples of embodiments.

Referring now to FIG. 10, a fastener bar 300 having a connector portion 320 according to other embodiments is illustrated. For example, in various embodiments, connector portion 320 of fastener bar 300 includes flats 330, shapes and/or or other features. In various embodiments, flats, shapes and/or other features 330 are configured to improve or increase adhesion or the bond of fastener bar 300 to the track shoe.

In various embodiments, fastener bar 200/300 is made from metallic materials, such as for example, steel or iron. It should be appreciated, however, that the fastener bar may be made from other materials. For example, the bars may be made of non-metallic materials including polymers, plastics, and composites such as fiberglass or carbon fiber. The material forming the fastener bar can have any desired surface finish, such as for example, a rust preventative type of galvanization.

In various embodiments, fastener bar 200/300 is made of and/or manufactured using wire stock and CNC forming machines, roll-threading and/or beading techniques known in the fastener industry generally. The bar may be formed by casting, forging, machining or precutting a high rigidity material including steel or any alloy. The bar may also be die cast, injection molded, 3D printed, and/or formed/sintered from powdered materials including metal and non-metallic materials.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

What is claimed is:

1. A track pad for a tracked vehicle, the track pad comprising:
    a single piece fastener bar comprising spaced apart, substantially parallel opposing legs extending outwardly from a connector portion extending between the opposing legs; and
    an elastomeric track shoe or pad provided around the connector portion and a portion of the opposing legs.

2. The track pad of claim 1, wherein the legs have threaded ends.

3. The track pad of claim 1, wherein a flange is provided around each opposing leg.

4. The track pad of claim 2, wherein a flange is provided around the threaded end of each opposing leg.

5. The track pad of claim 4, wherein the flange includes a lower surface that is exposed at a margin of the elastomeric track shoe.

6. The track pad of claim 1, wherein the opposing legs have a circular cross-sectional shape.

7. The track pad of claim 6, wherein the connector portion has a circular cross-sectional shape.

8. The track pad of claim 6, wherein at least a section of the connector portion has a circular cross-sectional shape.

9. The track pad of claim 1, wherein the fastener bar is made of wire stock.

10. The track pad of claim 1, wherein the fastener bar has a radius where each leg meets the connector portion.

11. A track pad for a tracked vehicle, the track pad comprising:
    a continuous fastener bar having opposing ends bent to form spaced apart, substantially parallel opposing legs extending outwardly from a connector portion extending between the opposing legs; and
    an elastomeric track shoe or pad provided around the connector portion and a portion of the opposing legs.

12. The track pad of claim 11, wherein the legs have threaded ends.

13. The track pad of claim 11, wherein a flange is provided around each opposing leg.

14. The track pad of claim 13, wherein a flange is provided around the threaded end of each opposing leg.

15. The track pad of claim 14, wherein the flange includes a lower surface that is exposed at a margin of the elastomeric track shoe.

16. The track pad of claim 11, wherein the opposing legs have a circular cross-sectional shape.

17. The track pad of claim 16, wherein the connector portion has a circular cross-sectional shape.

18. The track pad of claim 16, wherein at least a section of the connector portion has a circular cross-sectional shape.

19. The track pad of claim 11, wherein the fastener bar is made of wire stock.

20. The track pad of claim 11, wherein the fastener bar has a radius where each leg meets the connector portion.

* * * * *